United States Patent
Moon et al.

(10) Patent No.: US 9,714,028 B1
(45) Date of Patent: Jul. 25, 2017

(54) HYBRID VEHICLE AND METHOD OF CONTROLLING ENGINE CLUTCH THEREOF

(71) Applicant: HYUNDAI MOTOR COMPANY, Seoul (KR)

(72) Inventors: Seong Wook Moon, Seoul (KR); Seok Min Jeong, Suwon-si (KR); Ji Hoon Kang, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/366,735

(22) Filed: Dec. 1, 2016

(30) Foreign Application Priority Data

Jun. 30, 2016 (KR) .......................... 10-2016-0082534

(51) Int. Cl.
*B60W 10/02* (2006.01)
*B60W 20/40* (2016.01)
(Continued)

(52) U.S. Cl.
CPC ............... *B60W 20/40* (2013.01); *B60K 6/48* (2013.01); *F16D 48/06* (2013.01); *F16H 63/46* (2013.01);
(Continued)

(58) Field of Classification Search
CPC .......... B60W 20/40; F16H 63/46; B60K 6/48; B60Y 2200/92; B60Y 2300/42
See application file for complete search history.

(56) References Cited

U.S. PATENT DOCUMENTS 6,061,619 A * 5/2000 Schmitz ............... B60W 10/02
477/166
6,341,680 B1 * 1/2002 Ota ....................... B60W 30/18
192/3.55
(Continued)

FOREIGN PATENT DOCUMENTS

JP 2005-304229 A 10/2005
JP 2006-170120 A 6/2006
(Continued)

OTHER PUBLICATIONS

Office Action Korean Patent Application No. 10-2016-0082534 dated Apr. 6, 2017.

*Primary Examiner* — David J Hlavka
(74) *Attorney, Agent, or Firm* — McDermott Will & Emery LLP

(57) ABSTRACT

Disclosed herein are a method capable of controlling an engine clutch by estimating the speed of an electric motor in a situation where the speed of the motor is not measured, and a hybrid vehicle for performing the same. The method of controlling an engine clutch of a parallel-type hybrid vehicle includes determining whether a state of a transmission clutch and a predetermined state condition of an engine clutch are satisfied in a first controller, when an error occurs in motor RPM information sent from a second controller, replacing the motor RPM information with an input RPM of a transmission or an RPM of an engine, based on a result of the determination in the first controller, so as to send the same to a third controller, and controlling the engine clutch using the replaced motor RPM information in the third controller.

19 Claims, 4 Drawing Sheets

(51) Int. Cl.
    *F16H 63/46*     (2006.01)
    *B60K 6/48*     (2007.10)
    *F16D 48/06*     (2006.01)

(52) U.S. Cl.
    CPC ....... *B60Y 2200/92* (2013.01); *B60Y 2300/42* (2013.01); *F16D 2500/10412* (2013.01); *F16D 2500/1107* (2013.01); *F16D 2500/304* (2013.01); *F16D 2500/3065* (2013.01); *F16D 2500/3067* (2013.01); *F16D 2500/30421* (2013.01); *F16D 2500/30814* (2013.01); *F16D 2500/30816* (2013.01); *F16D 2500/70424* (2013.01); *Y10S 903/946* (2013.01)

(56) References Cited

U.S. PATENT DOCUMENTS 6,481,554 B1 * 11/2002 Ota .................. B60W 30/1819
                                                                        192/103 R
2014/0379184 A1 * 12/2014 Kim .................. F02N 11/108
                                                                        701/22

FOREIGN PATENT DOCUMENTS

| | | |
|---|---|---|
| JP | 2009-202713 A | 9/2009 |
| KR | 10-0859662 B1 | 9/2008 |
| KR | 10-1040350 B1 | 6/2011 |
| KR | 10-2015-0138761 A | 12/2015 |

\* cited by examiner

FIG. 3
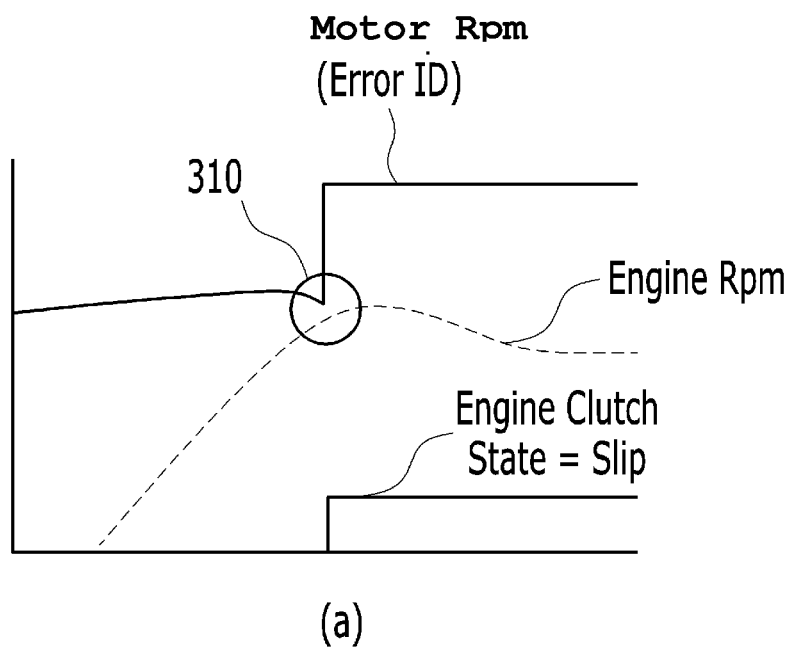
(a)
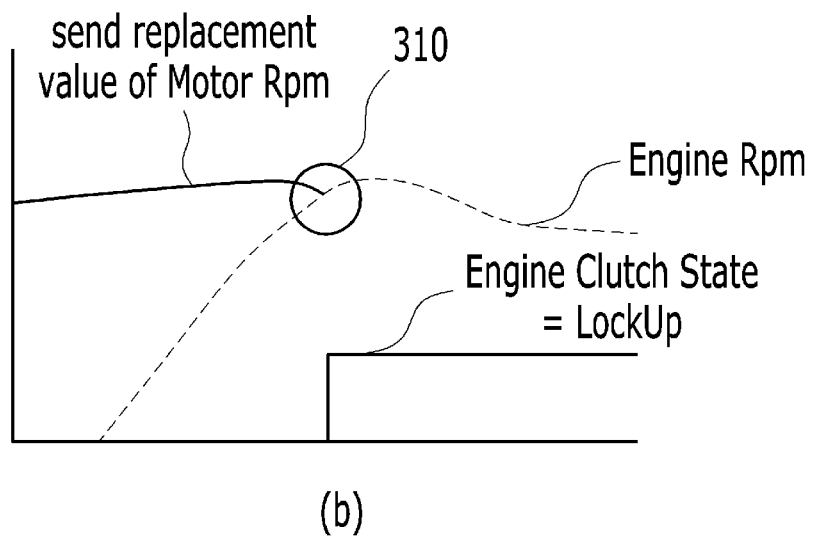
(b)

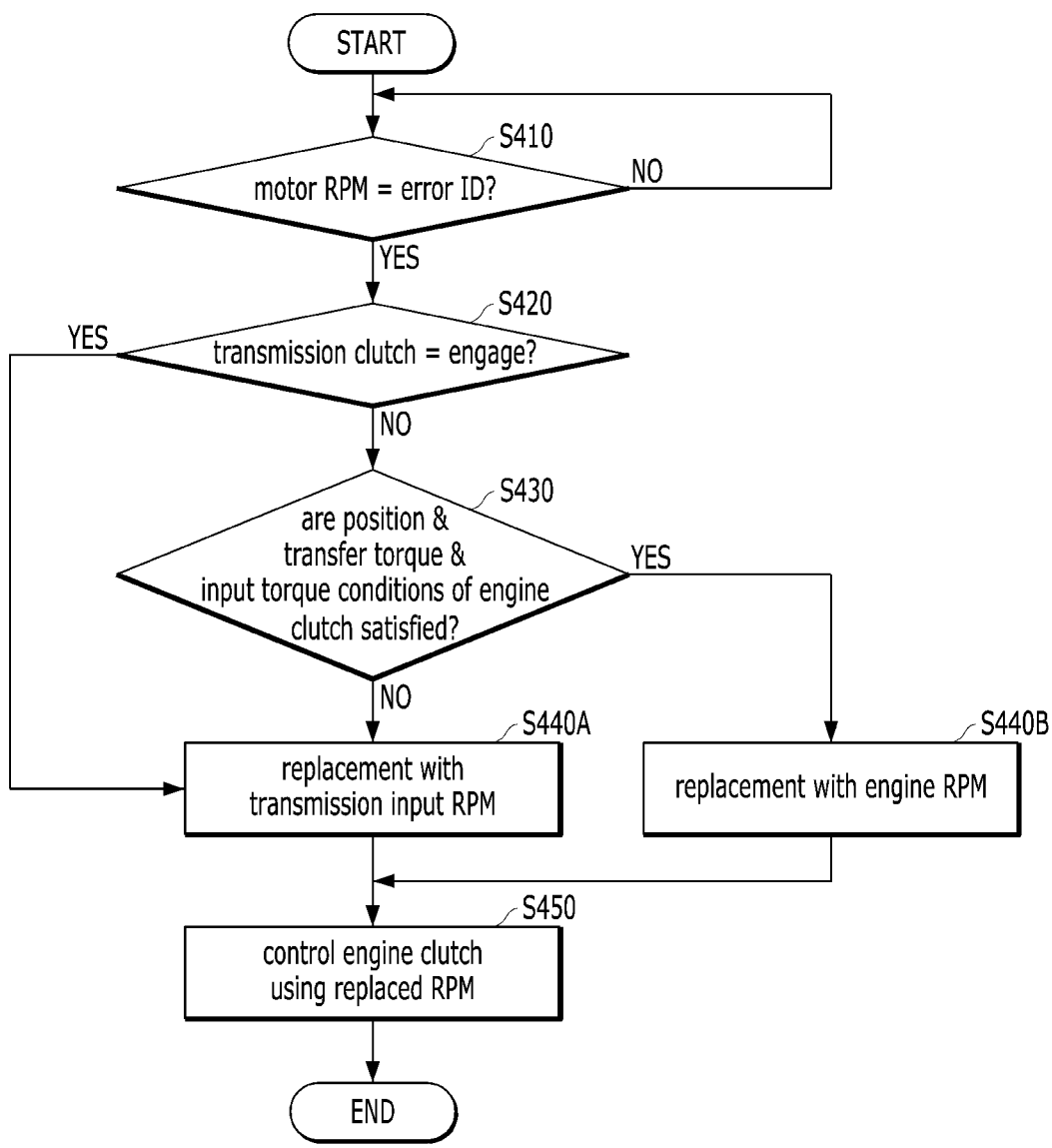

HYBRID VEHICLE AND METHOD OF CONTROLLING ENGINE CLUTCH THEREOF

CROSS-REFERENCE TO RELATED APPLICATION

This application claims the benefit of Korean Patent Application No. 10-2016-0082534, filed on Jun. 30, 2016, which is hereby incorporated by reference as if fully set forth herein.

TECHNICAL FIELD

The present disclosure relates to a hybrid vehicle and a method of controlling an engine clutch thereof, and more particularly, to a method of controlling an engine clutch by estimating the speed of an electric motor in a situation where the speed of the motor is not measured, and a hybrid vehicle for performing the same.

BACKGROUND

Hybrid vehicles refer generally to HEVs (Hybrid Electric Vehicles) which use two power sources, and the power sources are mainly an engine and an electric motor. In recent years, hybrid vehicles have been actively developed since they have an advantage of reducing emissions as well as having higher fuel efficiency and power performance, compared to vehicles having only internal combustion engines.

Such a hybrid vehicle may operate in either of two traveling modes according to which power train is driven. One is an EV (Electric Vehicle) mode, in which the vehicle is driven using only an electric motor, and the other is an HEV (Hybrid Electric Vehicle) mode, in which the vehicle is driven using power obtained by operating an engine together with the electric motor. The hybrid vehicle switches between the two modes while traveling depending on conditions.

Hybrid vehicles may be classified into various types depending on the arrangement of and connection between a motor and an engine. Among them, in a hybrid vehicle adopting a parallel-type or TMED-type (Transmission Mounted Electric Device type) hybrid system, an electric motor and an engine clutch (EC) are disposed between an engine and a transmission. The engine clutch serves to interconnect or disconnect the rotary shafts of the motor and the engine. Typically, interconnection is performed when the RPMs of the engine and the motor are close to each other within a certain range. Accordingly, it is necessary to know the RPMs of both the engine and the motor in order to control the engine clutch in the vehicle.

However, in a situation where it is difficult to known the RPM of the motor in the vehicle due to failure of the resolver of the motor or the like, it is impossible to perform the engagement control of the engine clutch. For this reason, the driving force of the engine may not be fully transmitted to a drive shaft, and hence starting performance may be deteriorated.

SUMMARY

Accordingly, the present disclosure is directed to a hybrid vehicle and a method of controlling an engine clutch thereof that substantially obviate one or more problems due to limitations and disadvantages of the related art.

An object of the present disclosure is to provide a method capable of more stably controlling an engine clutch in a hybrid vehicle, and a vehicle for performing the same.

In particular, the present disclosure aims to provide a method capable of controlling an engine clutch by estimating the speed of a motor in a situation where the speed of the motor may not be known, and a vehicle for performing the same.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of controlling an engine clutch of a parallel-type hybrid vehicle includes determining whether a state of a transmission clutch and a predetermined state condition of an engine clutch are satisfied in a first controller, when an error occurs in motor RPM information sent from a second controller, replacing the motor RPM information with an input RPM of a transmission or an RPM of an engine, based on a result of the determination in the first controller, so as to send the replaced motor RPM information to a third controller, and controlling the engine clutch using the replaced motor RPM information in the third controller.

In another aspect of the present disclosure, a parallel-type hybrid vehicle includes a first controller, a second controller configured to send motor RPM information to the first controller, and a third controller configured to control an engine clutch using the information obtained from the first controller. Here, When an error occurs in the motor RPM information sent from the second controller, the first controller may determine whether a state of a transmission clutch and a predetermined state condition of the engine clutch are satisfied, and may replace the motor RPM information with an input RPM of a transmission or an RPM of an engine, based on a result of the determination, so as to send the replaced motor RPM information to the third controller. In addition, the third controller may control the engine clutch using the replaced motor RPM information.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 3 is a view for explaining issues occurring when it is impossible to measure a motor speed; and FIG. 4 is a flowchart illustrating an example of a process of controlling an engine clutch by estimating a motor RPM according to an embodiment of the present disclosure.

DETAILED DESCRIPTION

Figure 1:
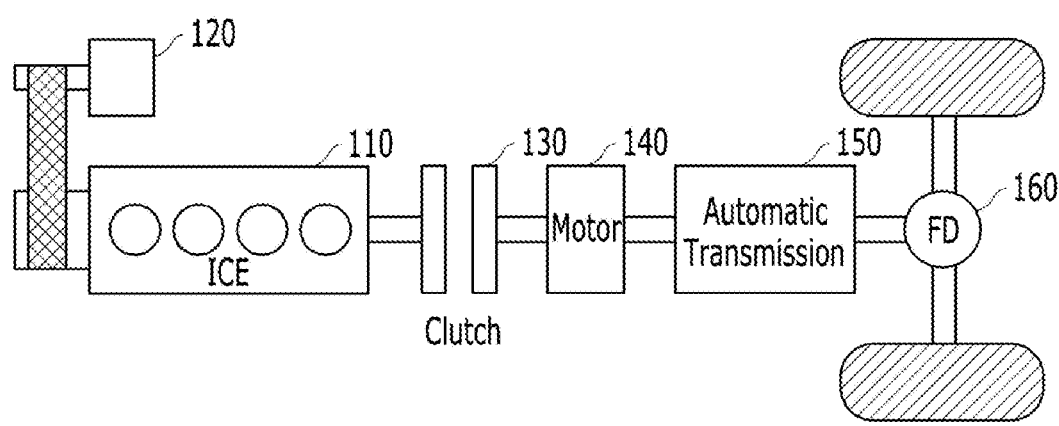
FIG. 1 is a diagram illustrating an example of a power train structure of a hybrid vehicle to which embodiments of the present disclosure are applicable.

Reference will now be made in detail to the preferred embodiments of the present disclosure, examples of which are illustrated in the accompanying drawings. Wherever possible, the same reference numbers will be used throughout the drawings to refer to the same or like parts. Terms such as "module" and "portion" used in the present disclosure are adopted only for easy writing of the disclosure, and are not intended to have specific meanings or play roles in themselves.

In addition, detailed descriptions of functions and constructions well known in the art may be omitted to avoid unnecessarily obscuring the gist of the present disclosure. Furthermore, the embodiment described in the specification and the construction shown in the drawings are nothing but one preferred embodiment of the present disclosure, and do not cover all the technical ideas of the disclosure. Thus, it should be understood that the scope and spirit of the present disclosure can be extended to all variations, equivalents, and replacements in addition to the appended drawings of the present disclosure.

First, the structure of a hybrid vehicle to which embodiments of the present disclosure are applicable will be described with reference to FIG. 1.

FIG. 1 is a diagram illustrating an example of the power train structure of the hybrid vehicle to which the embodiments of the present disclosure are applicable.

FIG. 1 illustrates the power train of the hybrid vehicle adopting a parallel-type hybrid system in which an electric motor (or a drive motor) 140 and an engine clutch 130 are installed between an internal combustion engine (ICE) 110 and a transmission 150.

Typically, when a driver presses an accelerator after starting the vehicle, the motor 140 is first driven using the electric power of a battery in the state in which the engine clutch 130 is opened, and wheels move by power transferred to a final drive (FD) 160 via the transmission 150 from the motor (i.e. an EV mode). When a larger driving force is required due to the gradual acceleration of the vehicle, the engine 110 may be driven by operating an auxiliary motor (or a starter/generator motor) 120.

Thus, when the RPMs of the engine 110 and the motor 140 are equal to each other, the engine clutch is in an engaged state so that the vehicle is driven by both the engine 110 and the motor 140 (i.e. transition from the EV mode to an HEV mode). When a predetermined engine off condition, such as the deceleration of the vehicle, is satisfied, the engine clutch 130 is opened and the engine 110 is stopped (i.e. transition from the HEV mode to the EV mode). In this case, the battery is charged through the motor using the driving force of the wheels in the vehicle, which is referred to as braking energy regeneration or regenerative braking. Accordingly, the starter/generator motor 120 serves as a starter motor when the engine is started, and serves as a generator when the rotational energy of the engine is recovered after starting or during starting off. Therefore, the starter/generator motor 120 may be referred to as an HSG (Hybrid Start Generator).

Figure 2:
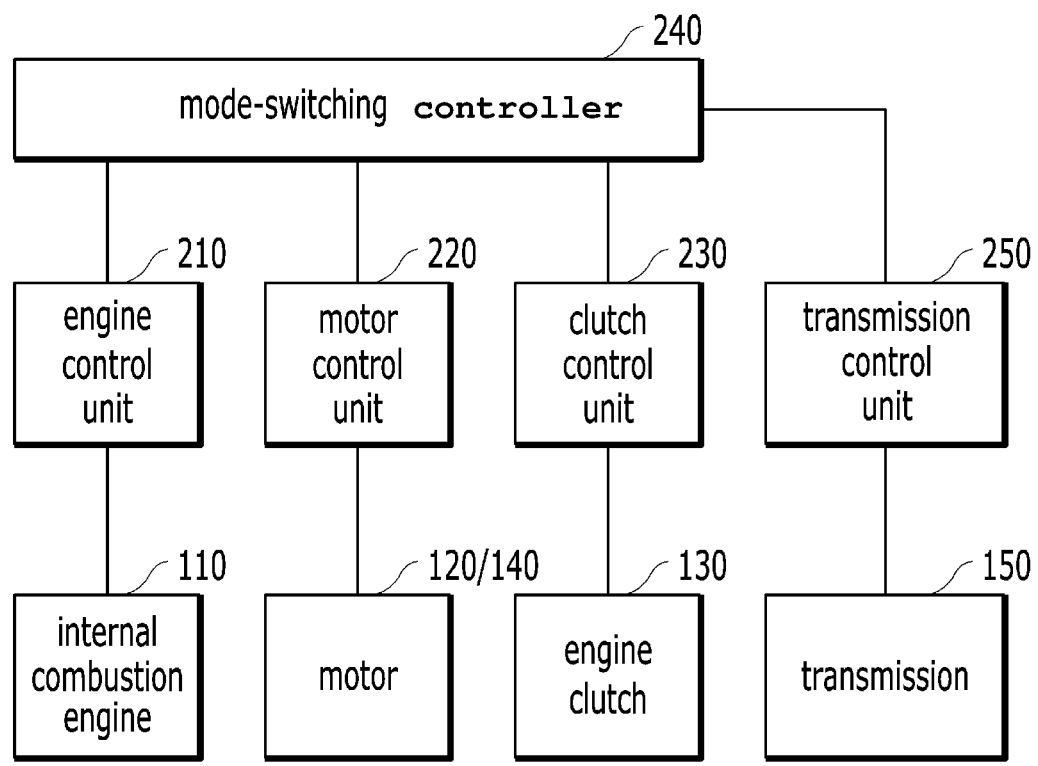
FIG. 2 is a block diagram illustrating an example of a control system of the hybrid vehicle to which the embodiments of the present disclosure are applicable.

FIG. 2 illustrates the relationship between control units in the vehicle to which the above-mentioned power train is applied.

FIG. 2 is a block diagram illustrating an example of a control system of the hybrid vehicle to which the embodiments of the present disclosure are applicable.

Referring to FIG. 2, in the hybrid vehicle to which the embodiments of the present disclosure are applicable, the internal combustion engine 110 may be controlled by an engine control unit 210, the torques of the starter/generator motor 120 and the motor 140 may be controlled by an MCU (Motor Control Unit) 220, and the engine clutch 130 may be controlled by a clutch control unit 230. Here, the engine control unit 210 is referred to as an EMS (Engine Management System). In addition, the transmission 150 is controlled by a transmission control unit 250. The transmission 150 may be a typical multistage automatic transmission (AT) or a dual clutch transmission (DCT).

Each control unit is connected to a mode-switching controller 240 which controls the overall mode switching process as a higher-level control unit. The control unit may provide the mode-switching controller 240 with information required to change the traveling mode according to the control of the mode-switching controller 240 and to control the engine clutch during gear shifting, and/or information required for engine stop control, or may perform an operation in response to control signals. Here, the mode-switching controller 240 may be referred to as an HCU (Hybrid Control Unit), but it is not necessarily limited thereto.

In more detail, the mode-switching controller 240 determines whether or not to perform mode switching depending on the traveling state of the vehicle. For example, the mode-switching controller determines the open time of the engine clutch 130 and performs hydraulic control (in the case of a wet EC) or torque capacity control (in the case of a dry EC) during the opening of the engine clutch. In addition, the mode-switching controller 240 may obtain information on an EC state (lock-up, slip, open, etc.) and control the stop time of fuel injection into the engine 110.

In particular, the mode-switching controller 240 obtains RPM information of the motor 140 from the motor control unit 220 and RPM information of the engine 110 from the engine control unit 210, and transfers them to the clutch control unit 230. If the motor control unit 220 does not know the motor RPM due to an abnormality of the resolver of the motor 140, the motor control unit 220 sends an error ID to the mode-switching controller 240.

The clutch control unit 230 may determine whether or not the engine clutch is in an engaged state, i.e. determine whether or not the engine clutch is in a lock-up state, based on the transfer torque of the current clutch (i.e. the torque applied to engage the clutch plates of the engine clutch) and a delta value between the RPMs of the motor 140 and the engine 110 obtained from the mode-switching controller 240.

However, when the motor control unit 220 sends an error ID to the mode-switching controller 240, the RPM information of the motor 140 may not be obtained from the clutch control unit 230, in which case it is impossible to determine whether or not the engine clutch 130 is in an engaged state. A detailed description thereof will be given with reference to FIG. 3.

FIG. 3 is a view for explaining issues occurring when it is impossible to measure a motor speed.

Referring to (a) of FIG. 3, in a typical hybrid vehicle, when a motor control unit sends an error ID (310), a clutch control unit may not know a motor RPM. Therefore, an engine clutch is not in a lock-up state, but is maintained in a slip state. For this reason, the torque of an engine is not fully transferred to a drive shaft, and hence starting performance is deteriorated.

However, as illustrated in (b) of FIG. 3, if a mode-switching controller estimates a motor RPM, replaces motor RPM information with an estimated value, and provides the same to the clutch control unit even when the motor control unit sends an error ID (310), the clutch control unit may determine whether or not the engine clutch is in an engaged state.

Accordingly, the embodiment of the present disclosure proposes a method of estimating the RPM of a motor using other information, which may be collected by a mode-switching controller, in the situation where the RPM of the motor may not be known, and based on the same, of sending the estimated RPM of the motor to a clutch control unit in order to control an engine clutch. The detailed description thereof will be given with reference to FIG. 4.

FIG. 4 is a flowchart illustrating an example of a process of controlling an engine clutch by estimating a motor RPM according to an embodiment of the present disclosure.

Referring to FIG. 4, when a motor control unit sends an error ID as motor RPM information (S410), a mode-switching controller checks the state information of a transmission clutch, which is sent from a transmission control unit (S420).

If the transmission clutch is in an "engaged" state (i.e. a state in which an input-stage gear engages with an output-stage gear in a transmission), the motor speed (RPM) is equal to the input speed of the transmission. Accordingly, the mode-switching controller may replace the motor RPM information with the input speed of the transmission, which is sent from the transmission control unit, and may send the same to a clutch control unit (S440A).

If the transmission clutch is not in the "engaged" state, the mode-switching controller determines the state conditions of an engine clutch (S430). In more detail, when three conditions, namely 1) the position condition of the engine clutch, 2) the absolute magnitude condition of transfer torque of the engine clutch, and 3) the relative magnitude condition of transfer torque of the engine clutch, are all satisfied, the mode-switching controller may determine that the engine clutch is in a lock-up state. Thus, the mode-switching controller replaces the motor speed with an engine speed and sends the engine speed (S440B). On the other hand, if at least one of the three conditions is not satisfied, the mode-switching controller may replace the motor RPM information with the input speed of the transmission, which is sent from the transmission control unit, and may send the same to a clutch control unit (S440A).

Here, 1) the position condition of the engine clutch may be satisfied when clutch plates, which are detected by a travel sensor in the engine clutch, are in a "closed" position. Here, the "closed" position refers to a position at which the clutch plates may come into contact with each other. Generally, in the "closed" position, the engine clutch may be in a slip or lock-up state.

Next, 2) the absolute magnitude condition of transfer torque of the engine clutch may be satisfied when the magnitude of torque, which is applied in the direction in which the clutch plates come into contact with each other in the engine clutch, reaches a certain level or more. Here, it is preferable that the certain level allows the engine clutch to be at least "closed".

In addition, 3) the relative magnitude condition of transfer torque of the engine clutch may be satisfied when the transfer torque is larger than the input shaft torque of the engine clutch. Here, the input shaft torque is typically the sum of engine torque and auxiliary motor torque.

The clutch control unit may control the engine clutch, e.g. determine whether or not the engine clutch is in an engaged state, based on the replaced RPM information sent from the mode-switching controller (S450).

The various embodiments disclosed herein, including embodiments of the mode-switching controller, the clutch control unit, and various other controllers or other control units, can be implemented using one or more processors coupled to a memory (or other non-transitory machine readable recording medium) storing computer-executable instructions for causing the processor(s) to perform the functions described above. Alternatively and/or optionally, the above-mentioned method can be embodied as computer-readable codes in media recorded with computer programs. The computer-readable media include all recording devices that store data readable by computer systems. Examples of computer-readable media include HDD (Hard Disk Drive), SSD (Solid State Disk), SDD (Solid Disk Drive), ROM, RAM, CD-ROM, magnetic tapes, floppy disks, optical data storage devices, etc., and include devices embodied in the form of carrier waves (e.g. transmission over the Internet).

As apparent from the above description, an engine clutch can be more stably controlled in a hybrid vehicle according to at least one of embodiments of the present disclosure.

In particular, since the RPM of a motor can be estimated from a component having an RPM closest to the RPM of the motor for each situation even though the RPM of the motor may not be directly known, the engine clutch can be controlled.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

What is claimed is:

1. A method of controlling an engine clutch of a parallel-type hybrid vehicle, comprising:
   determining whether a state of a transmission clutch and a predetermined state condition of an engine clutch are satisfied in a first controller, when an error occurs in motor RPM information sent from a second controller;
   replacing the motor RPM information with an input RPM of a transmission or an RPM of an engine, based on a result of the determination in the first controller, so as to send the replaced motor RPM information to a third controller; and
   controlling the engine clutch using the replaced motor RPM information in the third controller.

2. The method according to claim 1, wherein the replacing the motor RPM information comprises replacing the input RPM of the transmission with the motor RPM information, when the transmission clutch is in an engaged state or when the predetermined state condition is not satisfied.

3. The method according to claim 1, wherein the replacing the motor RPM information comprises replacing the RPM of the engine with the motor RPM information, when the transmission clutch is not in an engaged state or when the predetermined state condition is satisfied.

4. The method according to claim 1, wherein the predetermined state condition comprises a first condition for a position of the engine clutch, a second condition for an absolute magnitude of transfer torque of the engine clutch, and a third condition for a relative magnitude of the transfer torque.

5. The method according to claim 4, wherein the first condition is satisfied when the engine clutch is in a closed position.

6. The method according to claim 5, wherein the second condition is satisfied when the transfer torque is equal to or greater than a predetermined torque that causes the engine clutch to be in the closed position.

7. The method according to claim 4, wherein the third condition is satisfied when the transfer torque is equal to or greater than an input shaft torque of the engine clutch.

8. The method according to claim 7, wherein the input shaft torque corresponds to a sum of an engine torque and a starter/generator motor torque.

9. The method according to claim 1, wherein:
the first controller comprises a hybrid control unit (HCU);
the second controller comprises a motor control unit; and
the third controller comprises a clutch control unit that controls the engine clutch.

10. A non-transitory computer-readable recording medium storing a program, the program, when executed, causing a processor to perform the method according to claim 1.

11. A parallel-type hybrid vehicle comprising:
a first controller;
a second controller configured to send motor RPM information to the first controller; and
a third controller configured to control an engine clutch using the information obtained from the first controller, wherein:
when an error occurs in the motor RPM information sent from the second controller, the first controller determines whether a state of a transmission clutch and a predetermined state condition of the engine clutch are satisfied, and replaces the motor RPM information with an input RPM of a transmission or an RPM of an engine, based on a result of the determination, so as to send the replaced motor RPM information to the third controller; and the third controller controls the engine clutch using the replaced motor RPM information.

12. The parallel-type hybrid vehicle according to claim 11, wherein, when the transmission clutch is in an engaged state or when the predetermined state condition is not satisfied, the first controller replaces the input RPM of the transmission with the motor RPM information.

13. The parallel-type hybrid vehicle according to claim 11, wherein, when the transmission clutch is not in an engaged state or when the predetermined state condition is satisfied, the first controller replaces the RPM of the engine with the motor RPM information.

14. The parallel-type hybrid vehicle according to claim 11, wherein the predetermined state condition comprises a first condition for a position of the engine clutch, a second condition for an absolute magnitude of transfer torque of the engine clutch, and a third condition for a relative magnitude of the transfer torque.

15. The parallel-type hybrid vehicle according to claim 14, wherein the first condition is satisfied when the engine clutch is in a closed position.

16. The parallel-type hybrid vehicle according to claim 15, wherein the second condition is satisfied when the transfer torque is equal to or greater than a predetermined torque that causes the engine clutch to be in the closed position.

17. The parallel-type hybrid vehicle according to claim 14, wherein the third condition is satisfied when the transfer torque is equal to or greater than an input shaft torque of the engine clutch.

18. The parallel-type hybrid vehicle according to claim 17, wherein the input shaft torque corresponds to a sum of an engine torque and a starter/generator motor torque.

19. The parallel-type hybrid vehicle according to claim 11, wherein:
the first controller comprises a hybrid control unit;
the second controller comprises a motor control unit; and
the third controller comprises a clutch control unit that controls the engine clutch.

* * * * *